United States Patent [19]

Tabe et al.

[11] Patent Number: 4,778,573

[45] Date of Patent: Oct. 18, 1988

[54] ELECTROLYTE SOLUTION FOR ELECTROLYTIC METAL PLATING

[75] Inventors: Yoshinari Tabe, Chiba; Tamaki Iida, Tokyo, both of Japan

[73] Assignee: Shin-Etsu Chemical Co., Ltd., Tokyo, Japan

[21] Appl. No.: 113,111

[22] Filed: Oct. 27, 1987

[30] Foreign Application Priority Data

Oct. 28, 1986 [JP] Japan ................................ 61-256390

[51] Int. Cl.$^4$ .............................................. C25D 3/56
[52] U.S. Cl. ................................... 204/44.5; 204/43.1; 106/1.05
[58] Field of Search ..................... 204/43.1, 44.5, 44.7, 204/1.5; 106/1

[56] References Cited

U.S. PATENT DOCUMENTS 4,338,215 7/1982 Shaffer ................................... 204/16

Primary Examiner—Richard L. Andrews
Attorney, Agent, or Firm—Wenderoth, Lind & Ponack

[57] ABSTRACT

An improved aqueous electrolyte solution suitable as an electrolytic plating bath is disclosed which is capable of giving a magnetic layer of a cobalt-based alloy on a substrate of a magnetic recording medium used in a high-density vertical-mode magnetization. The electrolyte solution characteristically contains, in addition to the conventional salts of cobalt, manganese and nickel, reducing agent and pH buffering and controlling agents, a water-soluble rhenium salt such as ammonium perrhenate in a concentration of 0.002 to 0.015 mole/liter.

3 Claims, No Drawings

ELECTROLYTE SOLUTION FOR ELECTROLYTIC METAL PLATING

BACKGROUND OF THE INVENTION

The present invention relates to an electrolyte solution for electrolytic metal plating or, more particularly, to an aqueous electrolyte solution as a bath for electrolytic metal plating in the manufacturing process of magnetic recording media by vertical-mode magnetization suitable for high-density magnetic recording such as fixed magnetic discs, floppy discs and the like.

Along with the rapid progress in the computer technology in recent years, a great progress has been marked also in the data recording devices using, for example, magnetic discs for which it is eagerly desired to more and more increase the density of magnetic recording and the velocity of recording. One of the recently highlighted improvements in this regard is the conversion of the direction of magnetization from the conventional horizontal direction, i.e. within the plane of the magnetic layer, to the vertical direction, i.e. perpendicular to the plane of the magnetic layer. A great future progress can be forseen by this means in the increase of the density and velocity of magnetic recording on a magnetic recording medium.

The magnetization mode of the vertical magnetic recording consists in the direction of the magnetization which is perpendicular to the plane of the substrate or, consequently, to the plane of the magnetic layer on the substrate surface. This magnetization mode permits a high-density recording since the demagnetization field approximates zero even with a very short wavelength of recording. This means that the thickness of the magnetic layer may not be so small as compared to the horizontal mode of the magnetic recording in which high-density recording can be performed only with an extremely small thickness of the magnetic layer. In the vertical mode of the magnetization recording, moreover, very sharp magnetization reversal can be obtained in the magnetic recording medium or the magnetic domains because the demagnetization field scarcely acts on the areas of magnetization reversal contributing to an increase of the residual magnetic moment per bit. Therefore, the vertical mode of magnetization is advantageous in principle with a possibility of greatly improving the S/N ratio in the output of the recorded information to facilitate a high-density recording. It is important that the magnetic layer for such a magnetization mode should have an easily magnetizable axis in the direction perpendicular to the plane of the layer. This means that, assuming that the magnetic layer is formed of metallic cobalt, the easily magnetizable axis of the microcrystallites of $\alpha$-Co should be oriented perpendicularly to the plane of the magnetic layer. As is known, a thin magnetic layer of metallic cobalt on a substrate surface can be formed by several methods including the methods of vacuum vapor deposition, high-frequency sputtering and plating, the former two being performed in vacuum and the last being performed in an open system.

When an anisotropic magnetic field is applied to a magnetic layer on a substrate in a direction perpendicular to the plane of the layer, assuming that the cobalt-based magnetic layer is added with a dopant element such as nickel, manganese and chromium with an object to improve the magnetic properties by decreasing the saturation magnetization, areas of magnetization reversal are almost free from the influence of the demagnetization field so that the saturation magnetization is increased within the magnetic layer to satisfy the requirement for a vertical-mode magnetic recording medium that the saturation magnetization should exceed the demagnetization field.

It is generally understood that an ideally improved magnetic recording medium can be obtained by using chromium as a dopant element of cobalt when the magnetic layer is formed by the method of vacuum vapor deposition or high-frequency sputtering carried out in vacuum. These methods, however, are not quite feasible as an industrial process due to the relatively high costs because the process is complicate and lengthy. On the other hand, no effective dopant element is known for cobalt-based magnetic recording layer formed by the method of plating carried out in an open system despite the eager desire to prepare a cobalt-based magnet-ic layer by the inexpensive plating method.

In view of the above mentioned problem, the inventors have previously proposed an improved electrolyte solution as a bath for the electrolytic plating of a cobalt-based alloy (see Japanese Patent Kokai No. 61-179891). The electrolyte solution here proposed contains ions of cobalt, manganese and nickel as the principal metallic ingredients together with a reducing agent and buffering and controlling agents of pH. Although the magnetic layer obtained by using this electrolyte solution as the bath for electrolytic plating is indeed excellent in connection with the reproducibility of the metallic composition and magnetic performance suitable for a high-density magnetic recording medium, it is still not quite satisfactory as a magnetic recording layer for the vertical-mode magnetization.

SUMMARY OF THE INVENTION

The present invention, completed as a result of the extensive investigations undertaken in view of the above mentioned problems, provides an aqueous electrolyte solution for electrolytic plating which comprises ions of cobalt, manganese, nickel and rhenium as the metallic ingredients, a reducing agent, a pH buffering agent and a pH controlling agent each dissolved therein.

DETAILED DESCRIPTION OF THE PREFERRED EMBODIMENTS

As is understood from the above given description, the subject matter of the present invention is an improvement of the electrolyte solution disclosed in the above mentioned Japanese Patent Kokai No. 61-179891. Namely, the most characteristic ingredient in the inventive electrolyte solution is the ions of rhenium and the other ingredients may be conventional or may be common with those disclosed in the above mentioned prior art. The magnetic layer obtained by the electrolytic plating using the inventive electrolyte solution is imparted with greatly improved magnetic properties not obtained in the plating method using a conventional electrolyte solution.

Various kinds of water-soluble rhenium salts can be used as the source of the rhenium ions in the inventive electrolyte solution. Preferable ones are perrhenates or tetraoxorhenates such as ammonium perrhenate. The concentration of the rhenium salt or rhenium ions in the electrolyte solution should preferably be in the range from 0.002 to 0.015 mole/liter. When the concentration of the rhenium ions is too low, no substantial improvement can be obtained in the magnetic properties of the magnetic layer formed by the plating method as a matter of course. When the concentration of the rhenium ions is too large, on the other hand, the saturation magnetization of the magnetic layer would be unduly low. The concentrations of the manganese and nickel ions in the inventive electrolyte solution should be in the ranges from 0.02 to 0.04 mole/liter and from 0.035 to 0.045 mole/liter, respectively. It is preferable that the molar ratio of the cobalt ions to the manganese ions in the electrolyte solution should be in the range from 10.5 to 21 since otherwise no adequate orientation can be obtained of the crystalline axis of the metallic cobalt.

A preferable reducing agent to be added to the inventive electrolyte solution is sodium hypophosphite. It should be noted that the concentration of the reducing agent should properly be selected in accordance with the varied concentration of the rhenium ions and the molar ratio of the cobalt ions to manganese ions within the above mentioned ranges. The pH buffering and controlling agents may be conventional ones such as ammonium chloride and a combination of hydrochloric acid and cobalt hydroxycarbonate, respectively. The pH value of the electrolyte solution should preferably be kept in the range from 3.6 to 3.8.

In the following, the electrolyte solution of the present invention is described in more detail by way of an example.

EXAMPLE

A non-magnetic nickel-phosphorus layer was formed by plating on the surface of a non-magnetic substrate plate of an aluminum-magnesium alloy and a magnetic layer of an alloy of cobalt, nickel, manganese, rhenium and phosphorus was further formed thereon using an electrolyte solution described below as the electrolytic plating bath under the conditions described below.

(A) Formulation of the electrolyte solution
cobalt chloride $CoCl_2.6H_2O$: 0.42 mole/liter
manganese sulfate $MnSO_4.4-6H_2O$: 0.03 mole/liter
nickel chloride $NiCl_2.6H_2O$: 0.04 mole/liter
sodium hypophosphite $NaH_2PO_2.H_2O$: 0.14 mole/liter
ammonium chloride $NH_4Cl$: 1.87 moles/liter
ammonium perrhenate $NH_4ReO_4$: 0.007/mole/liter
(B) Conditions of electrolytic plating
pH of plating bath: 3.7 at 25° C.
temperature of plating bath: 50° C.
current density: $4A/dm^2$ The electrolytic plating was performed as described above for a varied length of time in the range from 30 seconds to about 5 minutes to deposit a layer of a cobalt-based alloy having a thickness of 0.25 μm to 2.5 μm depending on the length of time, of which the magnetic properties were examined. Thus, the coercive force $H_c$ of the magnetic layer was 1050 Oe and 450 Oe along the easily and hardly magnetizable axes, respectively. The deviation of orientation of the C-axis of $\alpha\text{-}CoΔ\theta_{50}$ was 7.1° showing a great improvement over the value of 12° when no rhenium salt was added to the electrolyte bath.

In the above described plating test, increase of the concentration of the rhenium salt from 0.002 to 0.015 mole/liter had an effect to decrease the saturation magnetization from 50 emu/g to 15 emu/g.

COMPARATIVE EXAMPLE

The same experimental procedure as above was repeated except that the formulation of the electrolyte solution was modified including omission of the rhenium salt, increase of the concentration of manganese sulfate from 0.03 to 0.06 mole/liter and decrease of the concentration of sodium hypophosphite from 0.14 to 0.09 mole/liter.

The magnetic layer thus formed had coercive forces $H_c$ of 1100 Oe and 400 Oe along the easily and hardly magnetizable axes, respectively. The deviation of orientation of the C-axis of $\alpha\text{-}CoΔ\theta_{50}$ was 12° and the saturation magnetization was 87 emu/g.

What is claimed is:

1. An aqueous electrolyte solution for electrolytic plating which consists essentially of metallic ingredients therein, ions of cobalt, manganese, nickel and rhenium, wherein the concentration of the ions of rhenium is in the range from 0.002 to 0.015 mole/liter, the concentration of nickel ions is in the range of 0.035 to 0.045 mole/liter, the concentration of manganese ions is in the range of from 0.02 to 0.04 mole/liter, and wherein the molar ratio of the concentration of cobalt ions to the manganese ions is in the range of from 10.5 to 21.

2. The aqueous electrolyte solution for electrolytic plating as claimed in claim 1 which has a pH in the range from 3.6 to 3.8.

3. In a process for electrolytically depositing a metal plating on a substrate to produce a metallic plate thereupon useful for magnetic recording which comprises electrolytically plating a substrate by electrodepositing metal(s) from an aqueous electrolyte solution onto said substrate, the improvement wherein the aqueous electrolyte solution contains as metallic ingredients therein ions of cobalt, manganese, nickel and rhenium, wherein the concentration of the ions of rhenium is in the range from 0.002 to 0.015 mole/liter, the concentration of nickel ions is in the range of 0.035 to 0.045 mole/liter, the concentration of manganese ions is in the range of from 0.02 to 0.04 mole/liter, and wherein the molar ratio of the concentration of cobalt ions to the manganese ions is in the range of from 10.5 to 21.

* * * * *